(12) United States Patent
Friedmann et al.

(10) Patent No.: US 12,314,424 B2
(45) Date of Patent: May 27, 2025

(54) DATA PLANE AUTHORIZATION

(71) Applicant: SAP SE, Walldorf (DE)

(72) Inventors: Bjoern Friedmann, Rheinmuenter (DE); Paulo Buettenbender, Sao Leopoldo (BR); Victor Matheus Silva Peixoto, Walldorf (DE); Lucas Mendonca de Souza Xavier, Sao Leopoldo (BR); Leonardo Pletsch, Porto Alegre (BR); Jascha Kanngiesser, Weisloch (DE); Joerg Franke, Brushsal (DE); Peter Haerle, Bammental (DE); Ioannis Kostis, Walldorf (DE)

(73) Assignee: SAP SE, Walldorf (DE)

( * ) Notice: Subject to any disclaimer, the term of this patent is extended or adjusted under 35 U.S.C. 154(b) by 508 days.

(21) Appl. No.: 17/514,482

(22) Filed: Oct. 29, 2021

(65) Prior Publication Data
US 2023/0140122 A1    May 4, 2023

(51) Int. Cl.
*H04L 9/00* (2022.01)
*G06F 21/45* (2013.01)
*G06F 21/62* (2013.01)

(52) U.S. Cl.
CPC .......... *G06F 21/6245* (2013.01); *G06F 21/45* (2013.01); *G06F 2221/2113* (2013.01); *G06F 2221/2141* (2013.01)

(58) Field of Classification Search
CPC .................. G06F 21/6245; G06F 21/45; G06F 2221/2113; G06F 2221/2141; G06F 16/27; G06F 21/6218
See application file for complete search history.

(56) References Cited

U.S. PATENT DOCUMENTS

2014/0188937 A1 *   7/2014   Kiefer ................... G06F 21/10
                                                          707/781

FOREIGN PATENT DOCUMENTS

EP            2869220 B1 *   7/2019   ............ G06F 16/211

* cited by examiner

*Primary Examiner* — Syed M Ahsan
(74) *Attorney, Agent, or Firm* — Buckley, Maschoff & Talwalkar LLC

(57) ABSTRACT

A system and method to receive a replicated representation of a data entity and a replicated representation of application specific permissions associated with the data entity, the application specific permissions being defined by a source application sourcing the data entity; store the replicated representations of the data entity and the application specific permissions in a dedicated storage space for the source application within a consolidated cloud storage; automatically generate a secured data entity based on an integration of the replicated representation of the application specific permissions with the replicated representation of the data entity; and store the generated secured data entity in the dedicated storage space for the source application.

18 Claims, 9 Drawing Sheets

600

```
┌─────────────────────────────────────────────────────┐
│ RECEIVE A REPLICATED REPRESENTATION OF` A DATA ENTITY│
│ AND A REPLICATED REPRESENTATION OF APPLICATION SPECIFIC│
│ PERMISSIONS ASSOCIATED WITH THE DATA ENTITY, THE     │
│ APPLICATION SPECIFIC PERMISSIONS BEING DEFINED BY A  │
│ SOURCE APPLICATION SOURCING THE DATA ENTITY          │
│                                                  605 │
└─────────────────────────────────────────────────────┘
                          │
                          ▼
┌─────────────────────────────────────────────────────┐
│ STORE THE REPLICATED REPRESENTATIONS OF THE DATA     │
│ ENTITY AND THE APPLICATION SPECIFIC PERMISSIONS IN A │
│ DEDICATED STORAGE SPACE FOR THE SOURCE APPLICATION   │
│ WITHIN A CONSOLIDATED CLOUD STORAGE                  │
│                                                  610 │
└─────────────────────────────────────────────────────┘
                          │
                          ▼
┌─────────────────────────────────────────────────────┐
│ AUTOMATICALLY GENERATE A SECURED DATA ENTITY         │
│ BASED ON AN INTEGRATION OF THE REPLICATED            │
│ REPRESENTATION OF THE APPLICATION SPECIFIC           │
│ PERMISSIONS WITH THE REPLICATED REPRESENTATION       │
│ OF THE DATA ENTITY                                   │
│                                                  615 │
└─────────────────────────────────────────────────────┘
                          │
                          ▼
┌─────────────────────────────────────────────────────┐
│ STORE THE GENERATED SECURED DATA ENTITY IN THE       │
│ DEDICATED STORAGE SPACE FOR THE SOURCE APPLICATION   │
│                                                  620 │
└─────────────────────────────────────────────────────┘
```

*FIG. 6*

DATA PLANE AUTHORIZATION

BACKGROUND

An enterprise, customer, or other end user may have a heterogenous data landscape including a plurality of products and offerings from one or more vendors and service providers. In an effort to provide a harmonized view of their data, the user might seek to join the data produced by the different products and offerings together. One aspect of providing a harmonized view of data from different products and offerings may be accomplished by joining the same semantic concepts from the different products together. Another aspect to consider is that a user or enterprise customer might typically implement at least some level of data security on their data to ensure safe, protected consumption thereof. In some aspects, the different products used by the customer might be configured to employ different types of security authorizations. As such, a system or service that centrally stores and provides access to data from different products and offerings should also provide security to the customer data stored thereby.

In some cases, a consolidated data storage provider or system may want to secure the data stored therein. For example, the provider might secure the data with the same security schema and mechanisms that a customer implements for the data in their data landscape. It would therefore be desirable to automatically replicate and store data and the security authorizations associated therewith in a consolidated cloud storage environment in an efficient and accurate manner.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is an illustrative flow diagram of a process for data plane authorizations, in accordance with an example embodiment;

Figure 1:
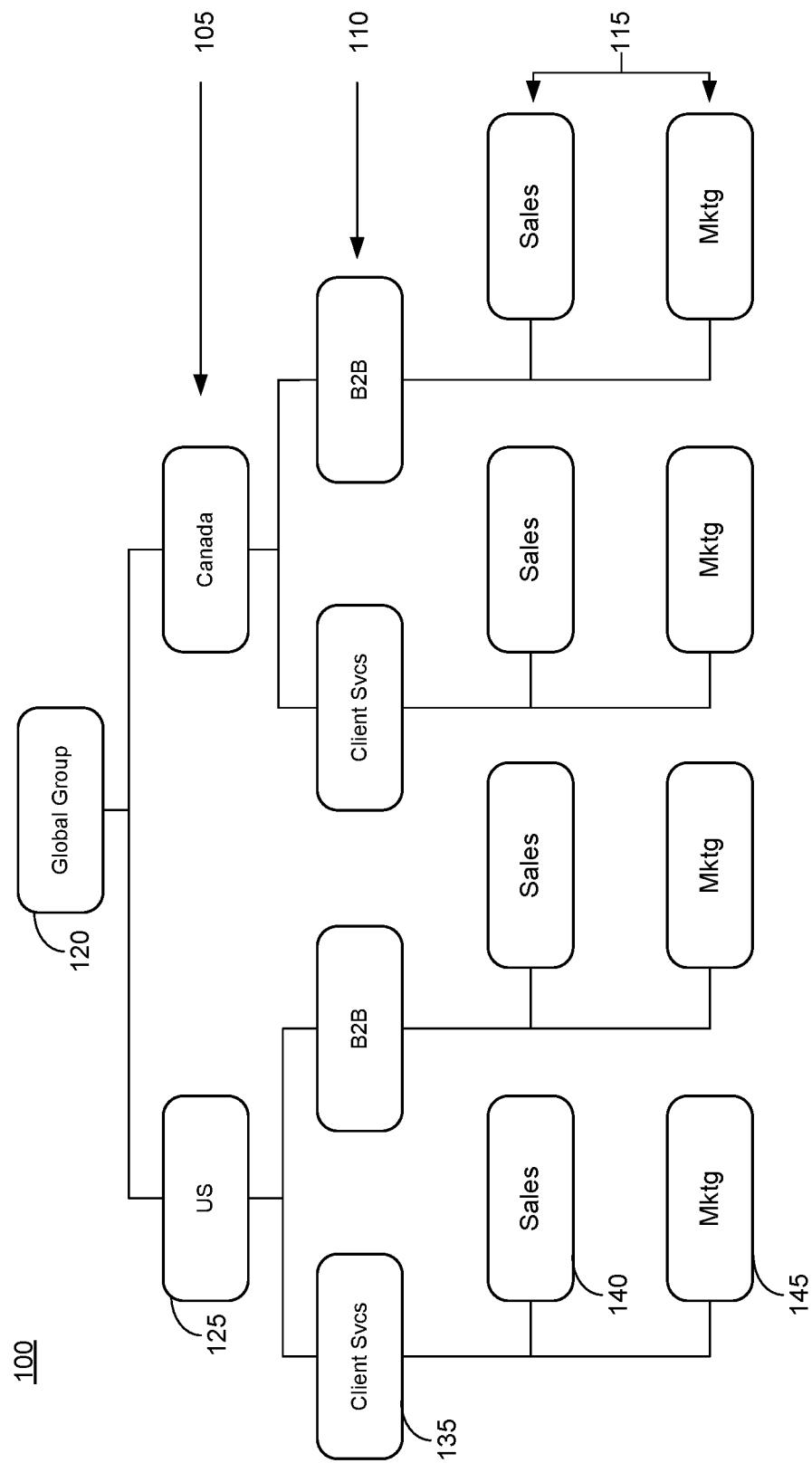
FIG. 1 is an illustrative depiction of a reporting hierarchy that may be used with data plane authorizations, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

A number of different types of data security permission schemes might be used to provide a level of security to data generated or otherwise used by computing applications. For example, an application might use hierarchies to control data access to the data associated with the application (e.g., data generated by or otherwise processed and output by the application). In this example, a user might be assigned to a hierarchy node (manually or automatically based on, for example, attributes associated with the user). FIG. 1 is an illustrative depiction of a hierarchy 100 where a user assigned to a node (e.g., node 125) can see or otherwise interact with data for their assigned node(s) and all the nodes below it/them. In the example of FIG. 1, three hierarchical levels are depicted, including a country level 105, a division level 110, and a department level 115. A user assigned to "Global group" 120 may be authorized to see all of the data represented by hierarchy 100, whereas a user assigned "US" node 125 and "Client Svcs" node 135 might be restricted to seeing data of those particular nodes and the below connected nodes 140 and 145. In some instances, data objects may include attributes specifying the hierarchy node(s) associated for the data object. For example, a data object might include an ID of its creator and be associated with the node to which the user is assigned.

Other data security authorization schemes may be used. For example, an application might use and support one or more levels of data access control based on data access control rules that define the security constraints on the data. The data access control rules might be defined, for example, based in groups, roles, permissions, and a username; allow or block access to a data object; and be asserted in various combinations. Some other types of security authorizations (i.e., permission concepts) might include, for example, "top down" tree security options that might restrict access to a specified structural dimension of a data object; role based permissions, and Permission as a Service (PaaS). In some aspects, the operations that a user or other entity might perform on a data object may be defined by the permissions that the user is granted for the data object.

While several examples of security authorizations have been provided, the present disclosure is not limited to the examples explicitly disclosed herein. The present disclosure may be compatible with the disclosed examples and other known and future developed types of security authorizations, unless otherwise stated.

Figure 2:
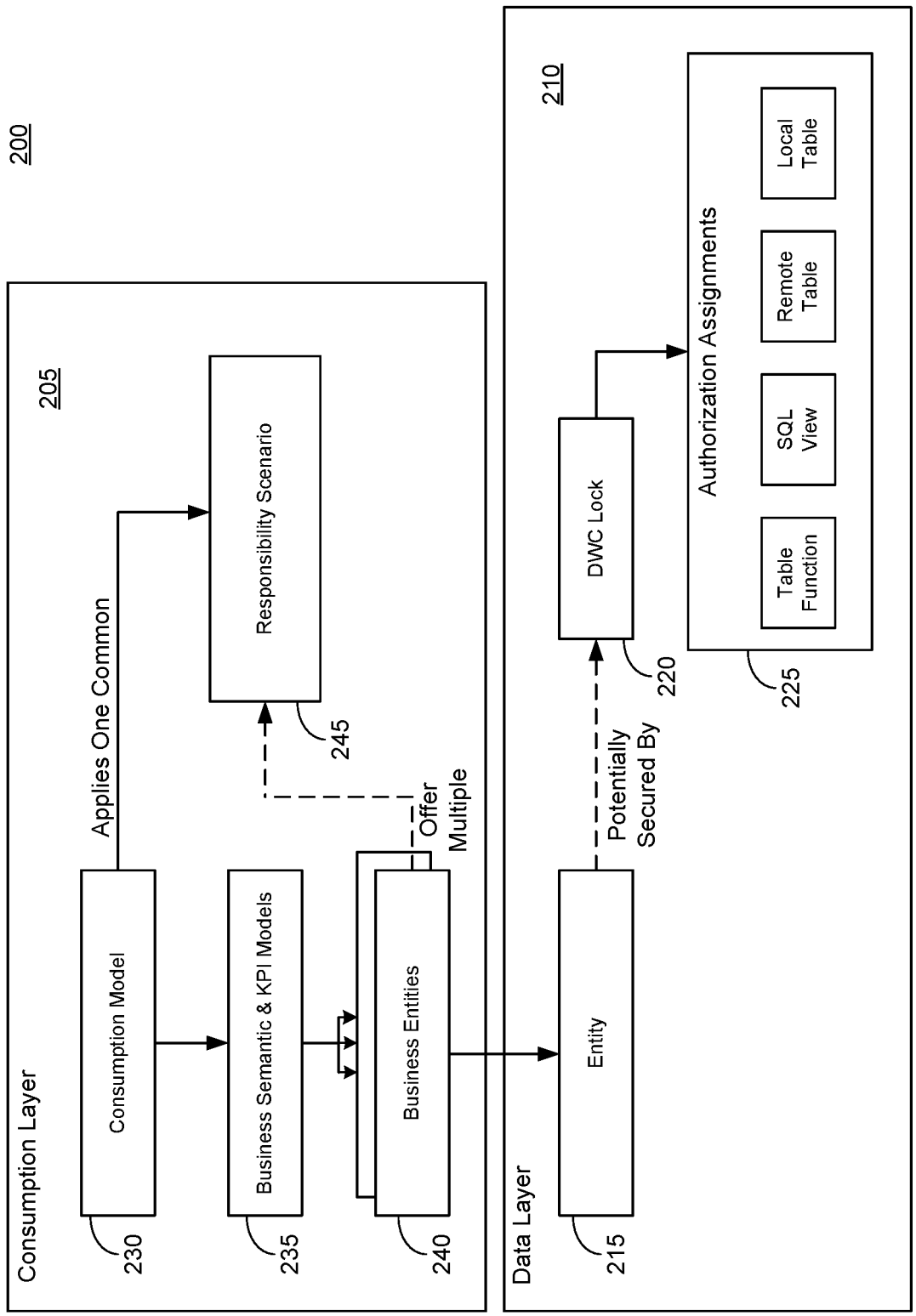
FIG. 2 is an illustrative block diagram depicting a relationship between a consumption layer and a data layer including a data access control lock, in accordance with an example embodiment.

FIG. 2 is an illustrative block diagram of a system 200 depicting a relationship between a consumption layer 205 and a data layer 210 including a data access control lock (e.g., 220), in accordance with an example embodiment. In some aspects, data layer 210 might operate to provide governed access to the data entities (e.g., data entity 215) that are centrally stored in the data access layer. Data layer 210 includes database entities 215, where a data entity may include, for example, a database table, projection view, calculation view, etc. In some embodiments, data layer 210 may be represented by a data warehouse cloud (DWC) that provides a central cloud-based storage for secured data objects from one or more applications (not shown in FIG. 2). As shown in FIG. 2, data entity 215 may be secured by DWC lock 220. DWC lock 220 may define a data access control (DAC) object that, in some embodiments, is re-useable, can protect multiple views in a data storage space of the data layer and responsibility scenarios 245 in the consumption layer. In some embodiments, multiple DACs (also referred to as a "lock" herein) can be used to protect a data entity. In some aspects, a lock herein might be defined at design-time to reference any relational data-layer artifact (i.e., data entity) and provide a mapping based on its output structure. Deployment of the lock might wrap this data-layer artifact into a run-time artifact to filter on, for example, an associated application user and add restrictions, add functions (e.g., error-handling, etc.), grant privileges and other authorization assignments 225.

In some aspects, an entity 215 in data layer 210 may be, for example, a database table that contains all of the data of that specific table. The table itself may make no distinction regarding users that consume the data, but rather includes all of the elements of the table.

Consumption layer 205 may include a user interface (UI) and analytics that consume secured data of the data layer. In some aspects, consumption layer 205 includes a consumption model 230 that points down to the secured entities (i.e., the entities 215 having the DWC lock(s) applied thereto) in data layer 210. The consumption model 230 and one or more business entities 240 defined based on business semantics and KPI (key performance indicators) 235 may collectively define one or more responsibility scenarios for consuming the secured data entities of the data layer.

Figure 3:
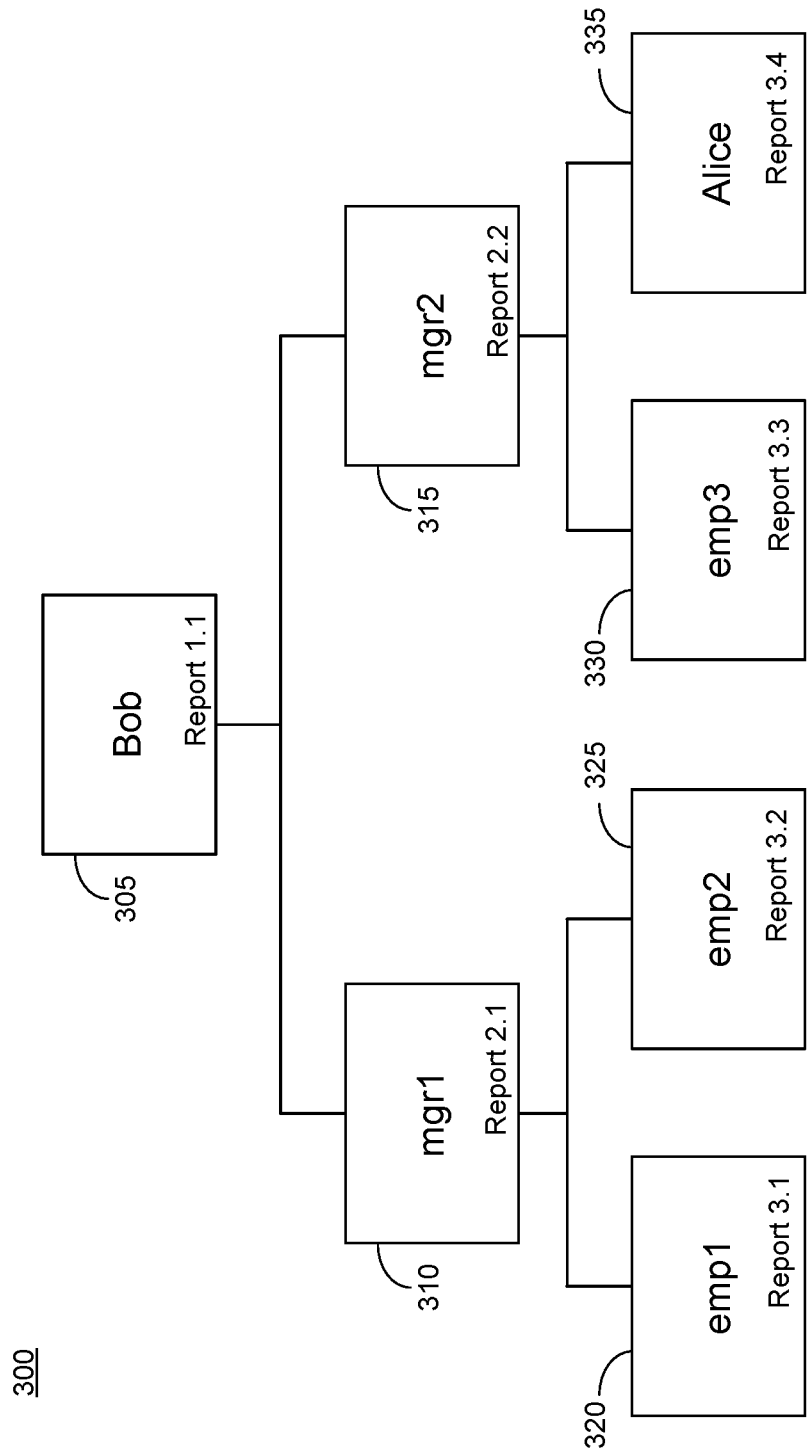
FIG. 3 is an illustrative depiction of some aspects of a user access permissions for a salary table, in accordance with an example embodiment.

FIG. 3 is an illustrative depiction of some aspects of a permission table 300 that might be associated with a data entity, in accordance with an example embodiment. Table 300 may represent permissions for a salary table that includes the salaries of the employees of a company. While table 300 includes the salaries of all of the employees of the company, a system herein may be configured to limit access to the data of table 300 for each user consuming the table to that portion (i.e., excerpt) of the data that each user is authorized to access. User authorizations for an application that generates or otherwise processes the salary data table might be hierarchy-based, as illustrated by the parent-child structure of table 300. Accordingly, all of the salary tables for this particular application may be protected by the same hierarchy-based authorization scheme depicted in FIG. 3, although the values (i.e., identities) of the users and the specific relationships therebetween might differ. In the example of FIG. 3, Bob (node 305) and managers 1 and 2 (node 310 and node 315, respectively) may access their own salary and the salary of their managed employees (e.g., manager 1 can see their salary and the salary of employee 1 (node 320) and employee 2 (node 325) and manager 2 can see their own salary and the salary of employee 3 (node 330) and Alice (node 335)). Note however that employees associated with nodes 320, 325, 330, and 335 are limited to only seeing their own data in the salary data table, based on the specified hierarchy-based permissions or authorizations shown in table 300.

In some aspects, table 300 represents a filter condition that limits the part of the salary table a user can access (e.g., see, modify, etc.). The filter condition may be viewed as a modeling task that models the logic that expresses that portion of the data table a user can access. This modeling task is also referred to and represented by a DWC lock or data access control (DAC) herein, such as, for example the lock or DWC 220 in FIG. 2.

The hierarchy-based authorization scheme depicted in FIG. 3 is an illustrative example, as opposed to a limitation, of the types of authorization and permission schemes, techniques, and security restrictions that might be associated with a data entity herein.

Figure 4:
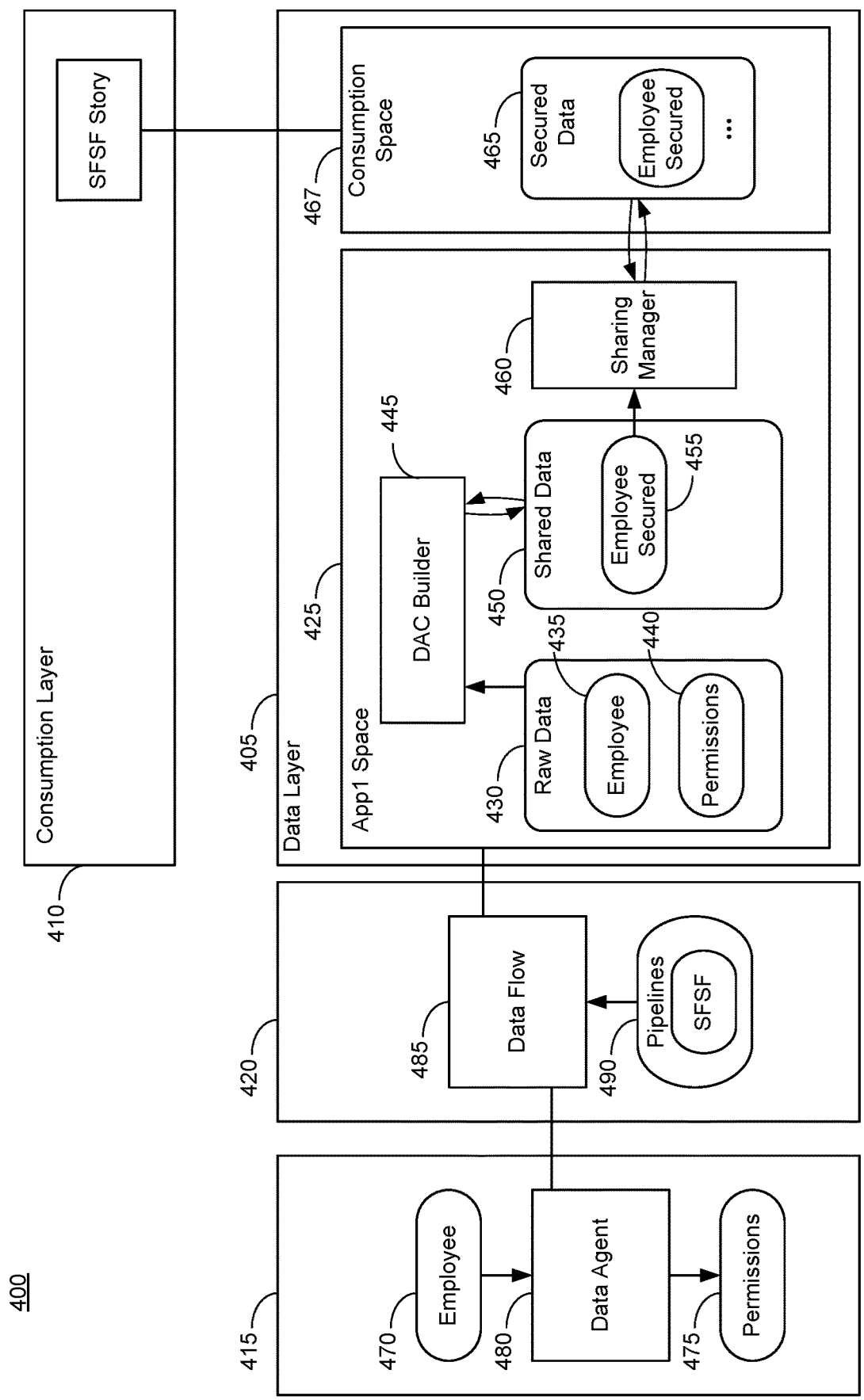
FIG. 4 is an illustrative block diagram of an example system architecture associated with data plane authorizations, in accordance with an example embodiment.

FIG. 4 is an illustrative system block diagram 400 of an example system architecture associated with data plane authorizations, in accordance with an example embodiment. In some aspects, FIG. 4 illustrates how data from a particular application and application specific permissions from the application for the data may be integrated, in accordance with some embodiments herein. System 400 includes a data layer 405 and a consumption layer 410. In some embodiments, data layer 405 might include a cloud-based integrated or consolidated data storage system that prides a central storage for data entities from one or more applications, services, systems, or products 415. In some instances herein, the different applications, services, systems, or products 415 may be referred to as an application or a source application.

In some embodiments, data in a cloud-based integrated or consolidated data storage system is managed in "spaces". Each space is, in some respects, similar to a data schema and provides a mechanism to separate data from different source applications into their own dedicated and distinct application specific bucket or space. FIG. 4 shows one source application 415 (i.e., App1) and one space 425 dedicated to App1. However, system 400 may typically encompass a plurality of different source applications that generate and process their own data that can be stored in the central cloud-based consolidated data storage system of data layer 405. One source application and one corresponding "space" for that source application are depicted in FIG. 4 for clarity of the figure, not as a limitation to system 400.

As used herein, the central cloud-based consolidated data storage system of data layer 405 is also referred to as a "data plane". In some embodiments, consumption layer 410 may represent an analytics platform or suite of analytic applications that ingest data of the source application(s) 415. In some embodiments, all access to the data by the consumption layer is via the data plane, where the data may be represented by virtual tables and other data structures (e.g., views, etc.).

Still referring to FIG. 4, source application 415 has a data entity 470 (i.e., employee table) and application specific permissions 475 defined for and associated with the data entity 470. Data agent 480 may operate to facilitate a transfer the data entity 470 and the permissions associated therewith to the data plane. In some aspects, a transfer mechanism or transfer protocol 420, represented by data flow 485 and using a pipeline 490 for source application 415, pulls data entity 470 from source application 415 and injects this data entity into space 425 in data plane 405. In the example of FIG. 4, there is a central place 430 where an exact representation 435 of the data 470 in the source application is replicated. This replicated data 435 is referred to herein as raw data since it is the data alone, without the security of the permissions 475 applied thereto.

In some aspects, to consume the data via consumption layer 410, a user might see a story (e.g., a collection of one or more analytical visualizations) 495 where they see the salary of the employees they are authorized to see. That is, the user will be permitted to see (e.g., access) the data they are allowed to see per the permissions 475 defined by the source application.

As such, some embodiments herein provide a mechanism and process to reflect the permissions 475 configured in the original source application 415. Some embodiments provide this mechanism and process automatically in the data plane or data layer 405.

In some embodiments, data flow 485 may operate to pull the data packet, data object, or other data structure representation of the application specific permissions from source application 415, in a manner similar to its retrieval of the "employee" table date entity 470. Both the data entity 470 and the associated permissions 475 may be injected into the data plane 405. In this manner, both data entity 470 and associated permissions 475 are replicated in the data plane at 435 and 440, respectively.

Data plane 405 further includes a modeling tool, a DAC builder 445, that models filter conditions (e.g., which rows of a data table or view projection of a data table, etc.) a user is allowed to see or otherwise access. DAC builder 445 may create a database view that points to the original data entity. In the example of FIG. 4, the created database view is labeled "Employee Secured" 455. This view is connected to the replicated "Employee" (raw) data 435 and is further integrated with the replicated permissions table 440. In some embodiments, DAC Builder 445 might model a JOIN between the replicated "Employee" table representation and the replicated "Permissions" table representation and use the filter condition(s) defined by the "Permissions" table to generate the resulting secured data database view "Employee Secured" 455. The generated secured data 455 may be stored in a secured data store 450 within the dedicated space 425 for the source application 415. The dedicated space 425 may further include a sharing manager 460 (or other mechanism) to facilitate sharing the secured data 455 with the consumption layer at run-time, in response to requests from a user via, for example, a UI (not shown in FIG. 4) of an analytics application.

In some embodiments, secured data (e.g., "Employee Secured" 455) may be transferred to a shared data space 465 within a consumption space 467. In some instances, multiple different secured data entities, each integrated with the permissions of their associated source application, may be transferred from their respective application space within data plane 425 to consumption space 467, where these multiple different secured data entities might be combined, aggregated, and otherwise processed to provide insight into the consolidated data across different applications.

In some aspects, authorizations generated by the DAC Builder might be reusable across different space entities. For example, a DWC lock herein may be a design time artifact that models authorizations. In some aspects, a deployed lock might be reused to protect multiple data layer objects (e.g., tables, views, etc.), as well as be used in the business layer responsibility scenarios.

In some embodiments, a DWC lock might be created based on a relational data-layer artifact (e.g., a table, view, or table function) that contains the authorization assignments (i.e., keys) to users and/or teams. The source object might include two columns for user assignment, including (1) a principal with username or team name and (2) a principal type with value user or team, and at least one output column. During lock creation in the DAC Builder, the lock editor may be used to select the user assignment relevant columns from the source object and output column (s).

Figure 5:
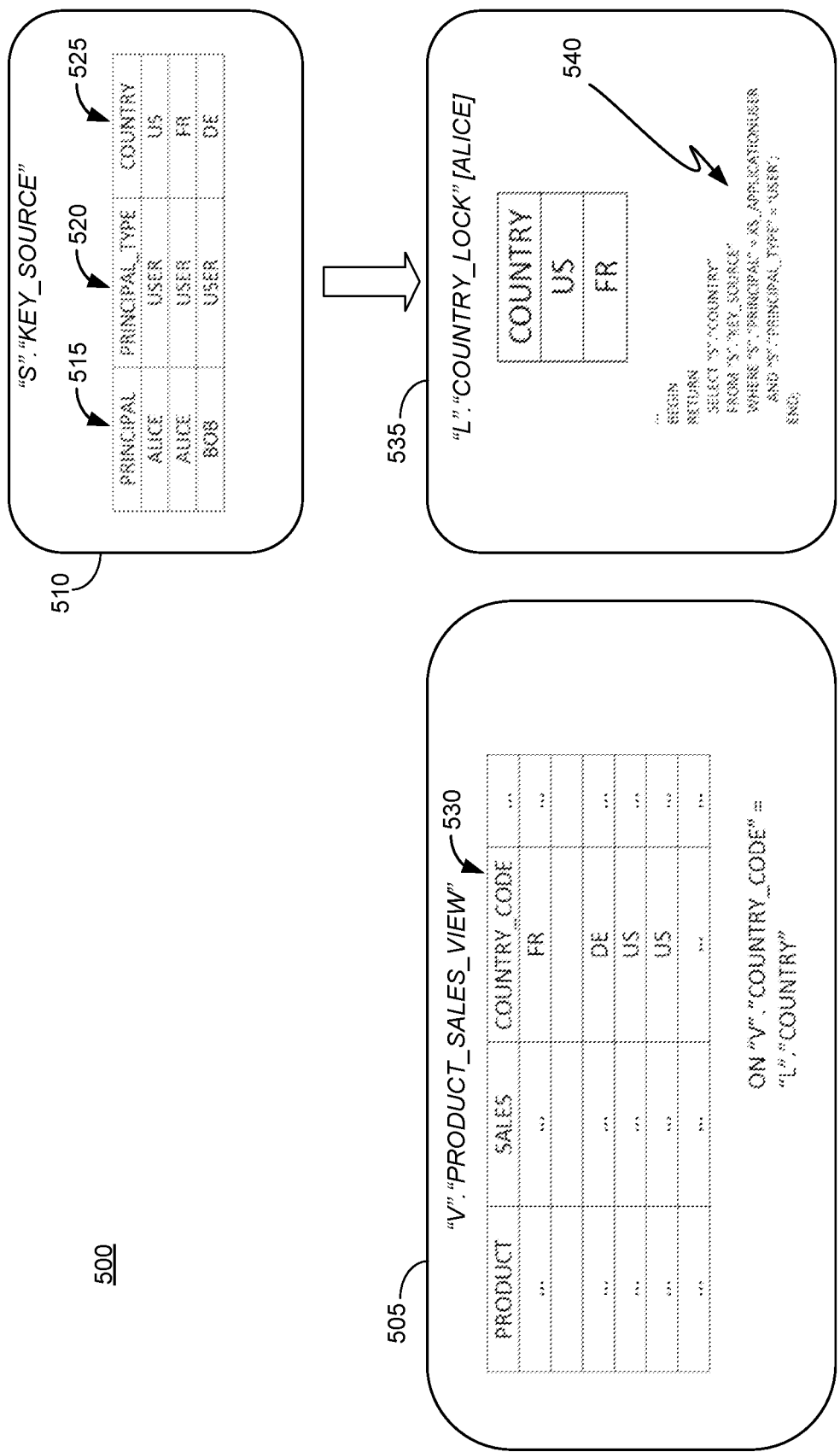
FIG. 5 is an illustrative depiction of examples of a data entity, a permission table, and an associated data access control lock, in accordance with an example embodiment.

FIG. 5 is an illustrative depiction 500 of examples of a data entity table 505, a permission table 510, and an associated data access control lock 535, in accordance with an example embodiment. In the example of FIG. 5, a raw data entity table 505 labeled "Product_Sales_View" is illustrated. This table includes a column 530 that includes a country code indicating country for the rows of product sales represented by the table. Permissions table 510 defines what particular portions of the data entity table 505 a user is authorized (i.e., permitted) to access. In particular, table 510 defines the particular country sales the user can see. For example, Alice can view sales for both the United States and France, whereas Bob can only see sales for Germany. As shown, table 510 includes two columns for user assignment (i.e., principal column 515 and principal type column 520), and one output column 525.

A DAC lock 535 representing the integration of the raw data entity table 505 and the permissions table 510 is also shown in FIG. 5. DAC lock 535 models the permissions associated with the data entity as defined by the original source application. An example expression (SQL) is depicted at 540 that specifies selecting the country column from the "Key_Source" (i.e., permissions) table and filtering on the logged on user and the data entity table.

FIG. 6 is an illustrative flow diagram of a process 600 for data plane authorizations, in accordance with an example embodiment. Process 600 demonstrates, at least in part, how aspects and features for data plane authorizations disclosed herein might operate. At operation 605, a replicated representation of a data entity and a replicated representation of application specific permissions associated with the data entity may be received by a consolidated cloud storage system (i.e., a data plane as referred to herein). The replicated representations of the data entity and the application specific permissions associated with the data entity may be retrieved (i.e., sourced) from a source application that defines the permissions. As disclosed in FIG. 4, the source application might include an agent or other functionality to facilitate the transfer of the replicated representation of the data entity and the replicated representation of the application specific to the data plane via a transfer channel (e.g., data flow, etc.).

At operation 610, the replicated representations of the data entity and the application specific permissions received from the source application are stored in a dedicated storage "space" for the source application within the consolidated cloud storage (i.e., data plane). In some aspects, the raw representation of the replicated data entity may not be exposed for consumption since it is not protected or otherwise secured by the governing permissions defined by the source application of the data entity.

Continuing with process 600 at operation 615, a secured data entity may be automatically generated based on an integration of the replicated representation of the application specific permissions with the replicated representation of the data entity. As described above in the description of FIG. 4, the integration of the permissions with the (raw) data entity may be facilitated by the generation of a model that expresses the filter conditions of the permissions as defined by the source application.

Operation 620 includes storing the generated secured data entity in the dedicated storage space of the source application. Now being secured in the data plane with the permissions/authorizations as specified by the source application, the secured data entity may be exposed for consumption. In this manner the original owner of the data entity can be assured that the data is protected as to their specifications. Moreover, the automatic integration of the permissions with the data entities stored in the data plane by features and elements of the data plane (e.g., DAC Builder, etc.) as disclosed in some embodiments herein alleviates the owner of the data from having to perform that task.

Figure 7:
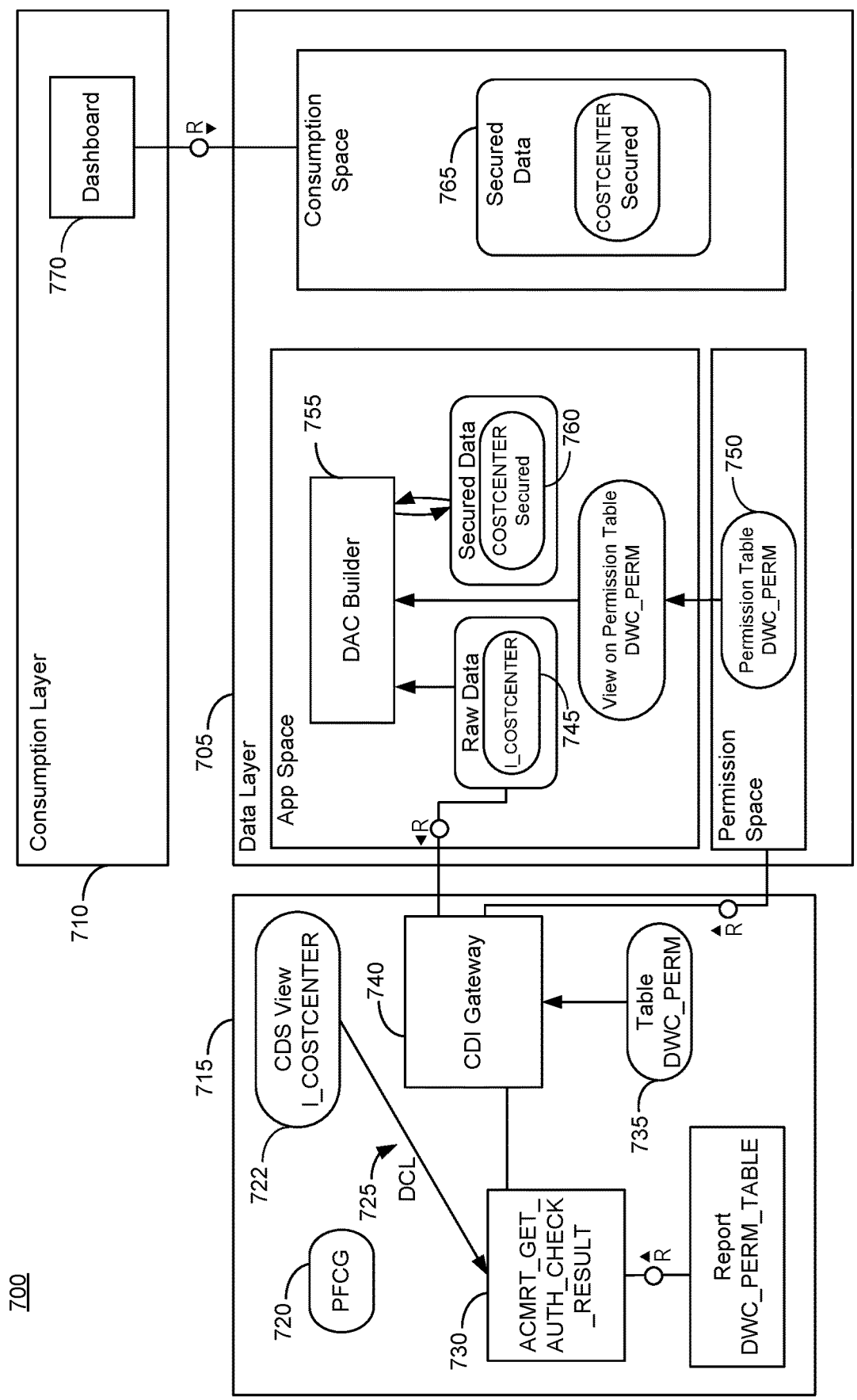
FIG. 7 is an illustrative block diagram of an example architecture including an example database platform and associated with data plane authorizations, in accordance with an example embodiment.

FIG. 7 is an illustrative block diagram 700 of an example system architecture including an example database platform 715 and associated with data plane authorizations, in accordance with an example embodiment. In general, system 700 may be viewed as a detailed version of system 400 disclosed in FIG. 4. In some aspects, the overall functionalities and features detailed regarding FIG. 4 are the same or similar for system 700 in FIG. 7. As such, some aspects introduced in the present disclosure regarding system 400 will not be repeated in the discussion of system 700.

In some embodiments, system 700 includes a consolidated data layer representing a data plane 705, a consumption layer 710 that consumes secured data items generated by the data plane, and a source application 715, where the source application represents an in-memory database platform. Database platform 715 may use role-based permission tables 720 to secure access to the data of the database platform. The data entities that will be replicated to data plane 705 are represented as CDS (core data services) views 722. The authorizations of each CDS view may be expressed in a data control language (DCL) as shown at 725. A combination of the assigned roles to a business user as defined in table 720 and the data expressed in the DCL can be used to determine or calculate, using a function 730 (e.g., a RFC, remote function call), what the user can access when they attempt to access CDS view 722 (e.g., "I_COSTCENTER"). The result of the combination is persisted in a permission table 735. To replicate what a user is allowed to access in the CDS view, the CDS view 722 (i.e., the date entity) and the permission table 735 are replicated over to the data plane 705 via a transport channel/protocol/mechanism 740. The replicated CDS view is shown at 745 and the replicated permission table is depicted at 750.

DAC Builder 755 (i.e., the modeler) operates to automatically integrate the replicated permission table 750 with the replicated data entity 745 using, in some instances a JOIN operation between the two database structures to generate the secured data entity 760. The secured data entity 760 may be represented by a database view pointing to the original permission table that specifies what part(s) of the database view the user can consume. Secured data entity 760 may be exposed and shared at 765, with other secured data entities (not shown in FIG. 7), for consumption (e.g., in dashboards 770).

Figure 8:
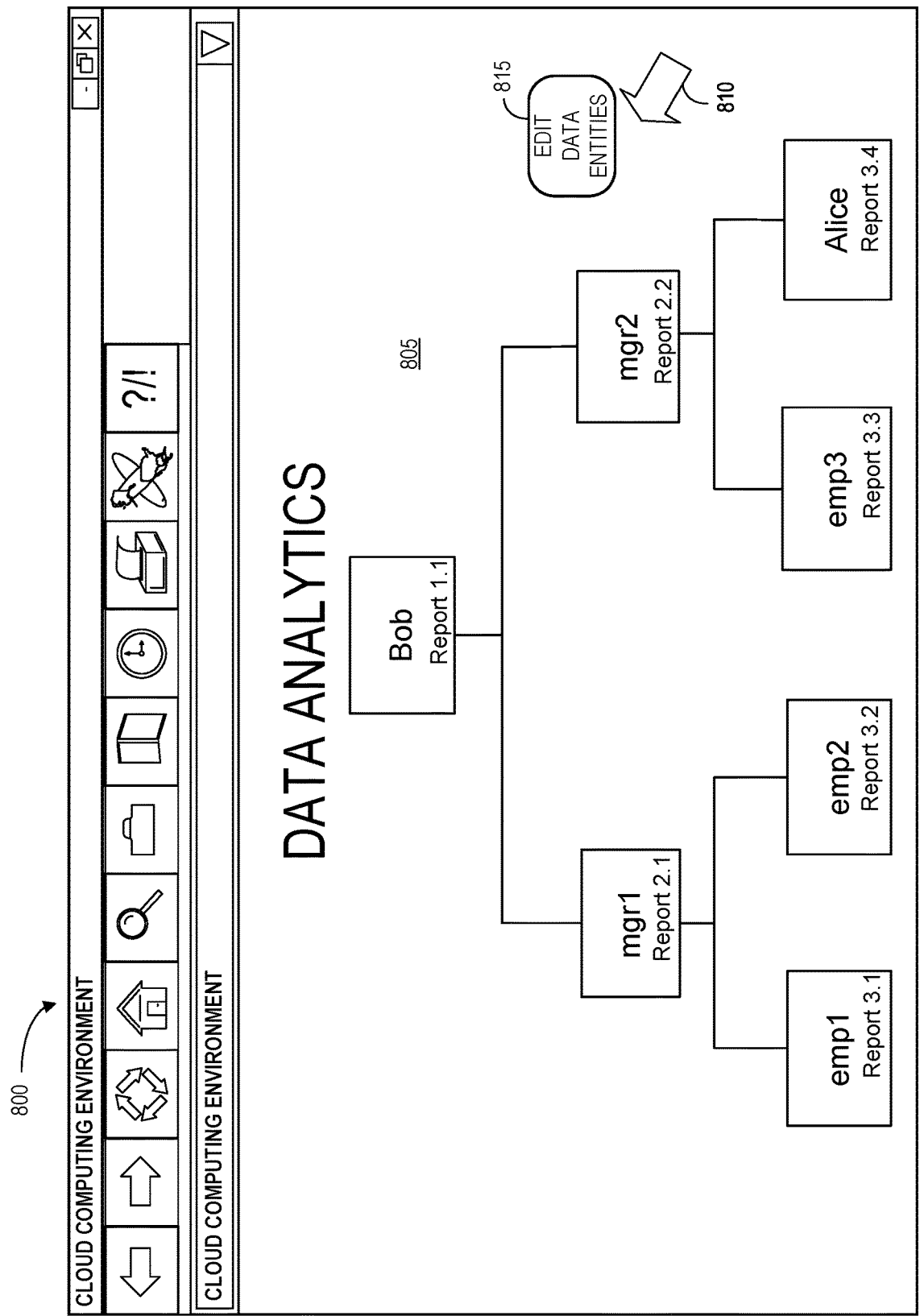
FIG. 8 is an outward facing user interface related to a system and process for data plane authorizations, in accordance with an example embodiment.

FIG. 8 is an outward-facing user interface related to a system and process for the integration of data entities and application specific permissions in a consolidated data plane, in accordance with an example embodiment. FIG. 8 is a human-machine interface display 800 in accordance with some embodiments. The display 800 includes a user interface 805 that may be used to select or specify one or more data entities (e.g., database table, database view, etc.) to be consumed by, for example, an analytics tool. In particular, selection of an element (e.g., a database table or a specific portion thereof via a touchscreen or computer mouse pointer 810) might result in the display of a popup window that presents a visualization or report based on the selected data entities, where the presented visualization is limited to the portions of data the user is authorized to see or access. Display 800 may also include a user selectable "Edit Data Entities" icon 815 to request a new, revised, or updated selection of data entities (e.g., to generate new dashboards or reports). In some aspects, a consolidated data plane herein that provides governed access to centrally stored data that may be associated with a plurality of applications employing a diversity of data access permissions and authorizations can provide users with and support advanced analytics that spans the multiple different applications, all while automatically integrating the original permissions and authorizations into the consolidated data.

Figure 9:
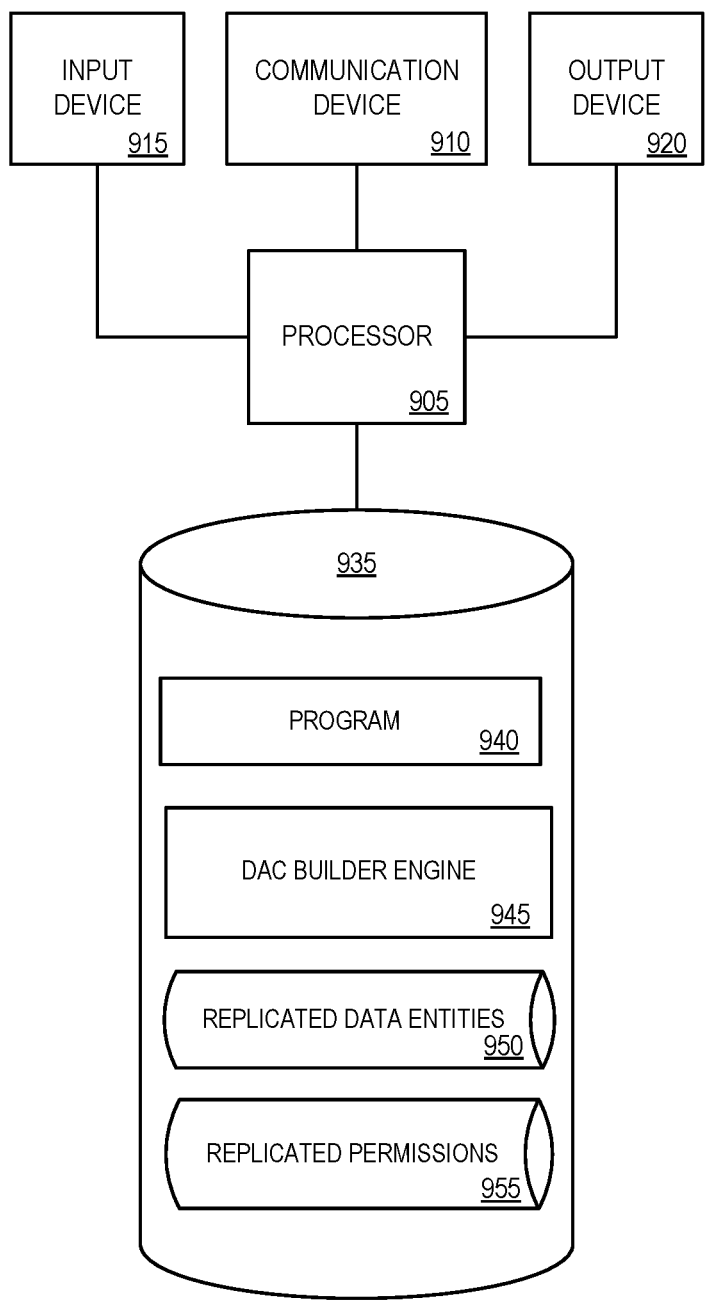
FIG. 9 is an illustrative block diagram of an apparatus or platform, in accordance with an example embodiment.

FIG. 9 is an illustrative block diagram of an apparatus or platform, in accordance with an example embodiment. Note that the embodiments described herein may be implemented using any number of different hardware configurations. For example, FIG. 9 is a block diagram of an apparatus or platform 900 that may be, for example, associated with systems 200, 400, and 700 of FIGS. 2, 4, and 7, respectively (and any other system described herein). Platform 900 comprises a processor 905, such as one or more commercially available CPUs in the form of one-chip microprocessors, coupled to a communication device 910 configured to communicate via a communication network (not shown in FIG. 9). Communication device 910 may be used to communicate, for example, with one or more remote applications or platforms. Apparatus 900 further includes an input device 915 (e.g., a computer mouse, a keyboard, etc.) and an output device 920 (e.g., a computer monitor to render a visualization, create reports, etc.). According to some embodiments, a mobile device, PC, and other devices may be used to exchange data with apparatus 900.

Processor 905 also communicates with a storage device 935. Storage device 935 can be implemented as a single database or the different components of storage device 935 can be distributed using multiple databases (that is, different deployment data storage options are possible). Storage device 935 may comprise any appropriate data storage device, including combinations of magnetic storage devices (e.g., a hard disk drive), optical storage devices, mobile telephones, and semiconductor memory devices to support and facilitate a data plane as disclosed herein. Storage device 935 stores a program 940 and DAC Builder engine 945 for controlling the processor 905. Processor 905 performs instructions of the programs 940, 945, and thereby operates in accordance with any of the embodiments described herein (e.g., FIGS. 4-7). Storage device 935 further stored replicated entities 950 and replicated permissions 955.

Programs 940, 945 may be stored in a compressed, uncompiled, encrypted, and other configured format. Programs 940, 945 may furthermore include other program elements, such as an operating system, clipboard application, a database management system, and device drivers used by processor 905 to interface with peripheral devices.

As used herein, data may be "received" by or "transmitted" to, for example: (i) the platform 900 from another device; or (ii) a software application or module within the platform 900 from another software application, module, or any other source.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and any other non-transitory transmitting or receiving medium such as the Internet, cloud storage, the Internet of Things (IoT), or other communication network or link. The article of manufacture containing the computer code may be made and used by executing the code directly from one medium, by copying the code from one medium to another medium, or by transmitting the code over a network.

The computer programs (also referred to as programs, software, software applications, "apps", or code) may include, for example, machine instructions for a programmable processor, and may be implemented in a high-level procedural, object-oriented programming language, assembly/machine language, etc. As used herein, the terms "machine-readable medium" and "computer-readable medium" refer to any computer program product, apparatus, cloud storage, Internet of Things, and device (e.g., magnetic discs, optical disks, memory, programmable logic devices (PLDs)) used to provide machine instructions and data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method, the method comprising:
   receiving, from a source application, a replicated representation of a data entity of the source application and a replicated representation of application specific permissions defined for and associated with the data entity, the application specific permissions being defined by the source application sourcing the data entity;
   storing the replicated representations of the data entity and the application specific permissions in a dedicated storage space for the source application within a consolidated cloud storage, the replicated representation of the application specific permissions and the replicated representation of the data entity stored within the consolidated cloud storage being separate and distinct from each other;
   automatically generating, by a process of the dedicated storage space for the source application within the consolidated cloud storage, a secured data entity based on an integration of the replicated representation of the application specific permissions with the replicated representation of the data entity, user access to the secured data entity being defined by the replicated representation of the application specific permissions and reflect permissions as specified by the source application; and
   storing the generated secured data entity in the dedicated storage space for the source application.

2. The method of claim 1, further comprising sharing the generated secured data entity for consumption across multiple different dedicated storage spaces within the consolidated cloud storage.

3. The method of claim 1, wherein the process of the dedicated storage space for the source application within the consolidated cloud storage for automatically generating the secured data entity is implemented by a modeler device that models filter conditions defined by the replicated representation of the application specific permissions.

4. The method of claim 1, wherein the data entity includes at least one of a database data table and a database view.

5. The method of claim 1, wherein the application specific permissions defines a user-specific authorization for access to the data entity.

6. The method of claim 1, further comprising:
   receiving, from a second source application, a second replicated representation of a second data entity of the second source application and a second replicated representation of application specific permissions defined for and associated with the data entity, the second application specific permissions being defined by the second source application sourcing the second data entity;
   storing the second replicated representations of the second data entity and the second application specific permissions in a second dedicated storage space for the source application within the consolidated cloud storage, the second dedicated storage space being distinct and separate from the dedicated storage space storing the application specific permissions;
   automatically generating, by a process of the second dedicated storage space for the second source application within the consolidated cloud storage, a second secured data entity based on an integration of the second replicated representation of the second application specific permissions with the second replicated representation of the second data entity, user access to the second secured data entity being defined by the second replicated representation of the second application specific permissions and reflect permissions configured in as specified by the second source application;
   storing the generated second secured data entity in the second dedicated storage space for the second source application; and
   sharing the generated secured data entity and the second secured data entity for consumption across multiple different dedicated storage spaces within the consolidated cloud storage.

7. A system comprising:
   a memory storing processor-executable program code; and a processor to execute the processor-executable program code in order to cause the system to:

receive, from a source application, a replicated representation of a data entity of the source application and a replicated representation of application specific permissions defined for and associated with the data entity, the application specific permissions being defined by a source application sourcing the data entity;

store the replicated representations of the data entity and the application specific permissions in a dedicated storage space for the source application within a consolidated cloud storage, the replicated representation of the application specific permissions and the replicated representation of the data entity stored within the consolidated cloud storage being separate and distinct from each other;

automatically generate, by a process of the dedicated storage space for the source application within the consolidated cloud storage, a secured data entity based on an integration of the replicated representation of the application specific permissions with the replicated representation of the data entity, user access to the secured data entity being defined by the replicated representation of the application specific permissions and reflect permissions as specified by the source application; and store the generated secured data entity in the dedicated storage space for the source application.

8. The system of claim 7, further comprising sharing the generated secured data entity for consumption across multiple different dedicated storage spaces within the consolidated cloud storage.

9. The system of claim 7, wherein the process of the dedicated storage space for the source application within the consolidated cloud storage for automatically generating the secured data entity is implemented by a modeler device that models filter conditions defined by the replicated representation of the application specific permissions.

10. The system of claim 7, wherein the data entity includes at least one of a database data table and a database view.

11. The system of claim 7, wherein the application specific permissions defines a user-specific authorization for access to the data entity.

12. The system of claim 7, further configured to execute the processor-executable program code in order to cause the system to:

receive, from a second source application, a second replicated representation of a second data entity of the second source application and a second replicated representation of application specific permissions defined for and associated with the data entity, the second application specific permissions being defined by the second source application sourcing the second data entity;

store the second replicated representations of the second data entity and the second application specific permissions in a second dedicated storage space for the source application within the consolidated cloud storage, the second dedicated storage space being distinct and separate from the dedicated storage space storing the application specific permissions;

automatically generate, by a process of the second dedicated storage space for the second source application within the consolidated cloud storage, a second secured data entity based on an integration of the second replicated representation of the second application specific permissions with the second replicated representation of the second data entity, user access to the second secured data entity being defined by the second replicated representation of the second application specific permissions and reflect permissions as specified by the second source application;

store the generated second secured data entity in the second dedicated storage space for the second source application; and share the generated secured data entity and the second secured data entity for consumption across multiple different dedicated storage spaces within the consolidated cloud storage.

13. A non-transitory, computer readable medium storing instructions, which when executed by at least one processor cause a computer to perform a method comprising:

receiving, from a source application, a replicated representation of a data entity of the source application and a replicated representation of application specific permissions defined for and associated with the data entity, the application specific permissions being defined by the source application sourcing the data entity;

storing the replicated representations of the data entity and the application specific permissions in a dedicated storage space for the source application within a consolidated cloud storage, the replicated representation of the application specific permissions and the replicated representation of the data entity stored within the consolidated cloud storage being separate and distinct from each other;

automatically generating, by a process of the dedicated storage space for the source application within the consolidated cloud storage, a secured data entity based on an integration of the replicated representation of the application specific permissions with the replicated representation of the data entity, user access to the secured data entity being defined by the replicated representation of the application specific permissions and reflect permissions as specified by the source application; and storing the generated secured data entity in the dedicated storage space for the source application.

14. The medium of claim 13, further comprising sharing the generated secured data entity for consumption across multiple different dedicated storage spaces within the consolidated cloud storage.

15. The medium of claim 13, wherein the process of the dedicated storage space for the source application within the consolidated cloud storage for automatically generating the secured data entity is implemented by a modeler device that models filter conditions defined by the replicated representation of the application specific permissions.

16. The medium of claim 13, wherein the data entity includes at least one of a database data table and a database view.

17. The medium of claim 13, wherein the application specific permissions defines a user-specific authorization for access to the data entity.

18. The medium of claim 13, further comprising:

receiving, from a second source application, a second replicated representation of a second data entity of the second source application and a second replicated representation of application specific permissions defined for and associated with the data entity, the second application specific permissions being defined by the second source application sourcing the second data entity;

storing the second replicated representations of the second data entity and the second application specific permissions in a second dedicated storage space for the source application within the consolidated cloud storage, the second dedicated storage space being distinct and separate from the dedicated storage space storing the application specific permissions;

automatically generating, by a process of the second dedicated storage space for the second source application within the consolidated cloud storage, a second secured data entity based on an integration of the second replicated representation of the second application specific permissions with the second replicated representation of the second data entity, user access to the second secured data entity being defined by the second replicated representation of the second application specific permissions and reflect permissions as specified by the second source application;

storing the generated second secured data entity in the second dedicated storage space for the second source application; and sharing the generated secured data entity and the second secured data entity for consumption across multiple different dedicated storage spaces within the consolidated cloud storage.

\* \* \* \* \*